United States Patent
Zhang et al.

(10) Patent No.: US 12,260,054 B2
(45) Date of Patent: Mar. 25, 2025

(54) TOUCH SUBSTRATE AND DISPLAY PANEL

(71) Applicant: WUHAN CHINA STAR OPTOELECTRONICS SEMICONDUCTOR DISPLAY TECHNOLOGY CO., LTD., Hubei (CN)

(72) Inventors: Zhen Zhang, Hubei (CN); Jian Ye, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/758,013

(22) PCT Filed: May 18, 2022

(86) PCT No.: PCT/CN2022/093470
§ 371 (c)(1),
(2) Date: Jun. 26, 2022

(87) PCT Pub. No.: WO2023/216283
PCT Pub. Date: Nov. 16, 2023

(65) Prior Publication Data
US 2024/0192813 A1 Jun. 13, 2024

(30) Foreign Application Priority Data
May 9, 2022 (CN) .......................... 202210497304.8

(51) Int. Cl.
*G06F 3/044* (2006.01)
(52) U.S. Cl.
CPC .......... *G06F 3/0446* (2019.05); *G06F 3/0448* (2019.05); *G06F 2203/04111* (2013.01)

(58) Field of Classification Search
CPC .... G06F 3/0412; G06F 3/0443; G06F 3/0446; G06F 2203/04103; G06F 2203/04111;
(Continued)

(56) References Cited

U.S. PATENT DOCUMENTS 9,965,115 B2 * 5/2018 Ye .......................... G06F 3/0443
2018/0107315 A1 * 4/2018 Lee .................... G02F 1/134309
(Continued)

FOREIGN PATENT DOCUMENTS

| CN | 104077002 A | 10/2014 |
| CN | 104793833 A | 7/2015 |

(Continued)

OTHER PUBLICATIONS

International Search Report in International application No. PCT/CN2022/093470, mailed on Nov. 28, 2022.
(Continued)

*Primary Examiner* — Koosha Sharifi-Tafreshi
(74) *Attorney, Agent, or Firm* — PV IP PC; Wei Te Chung

(57) ABSTRACT

A touch substrate and a display panel are provided by this disclosure. The touch substrate includes a plurality of touch units, each touch unit has a first electrode and a second electrode. The first electrode includes a first trunk electrode and a plurality of first branch electrodes. The first trunk electrode is parallel to a first direction. The first branch electrodes are disposed on two sides of the first trunk electrode. The first branch electrodes extend outwardly with the first trunk electrode as a center to form a radial structure. The second electrode includes a second trunk electrode and a plurality of second branch electrodes. The second trunk electrode is parallel to a second direction. The second branch electrodes are disposed on two sides of the second trunk electrode. The first branch electrodes and the second branch
(Continued)

electrodes are alternately disposed to form an occlusal structure.

18 Claims, 5 Drawing Sheets

(58) Field of Classification Search
CPC . G06F 3/044; G06F 3/041; G06F 2203/04112
See application file for complete search history.

(56) References Cited

U.S. PATENT DOCUMENTS

| | | | |
|---|---|---|---|
| 2018/0224968 A1* | 8/2018 | Church | G06F 3/0448 |
| 2023/0195248 A1* | 6/2023 | Ye | G06F 3/0412 |
| | | | 345/174 |

FOREIGN PATENT DOCUMENTS

| | | | | |
|---|---|---|---|---|
| CN | 110764660 A | | 2/2020 | |
| CN | 111552414 A | | 8/2020 | |
| CN | 111651090 A | * | 9/2020 | ........... G06F 3/0412 |
| CN | 111736736 A | | 10/2020 | |
| CN | 114415868 A | | 4/2022 | |
| GB | 201702115 | | 3/2017 | |

OTHER PUBLICATIONS

Written Opinion of the International Search Authority in International application No. PCT/CN2022/093470, mailed on Nov. 28, 2022.

\* cited by examiner

TOUCH SUBSTRATE AND DISPLAY PANEL

FIELD OF DISCLOSURE

This disclosure relates to a technical field of display devices, and specifically to a touch substrate and a display panel.

BACKGROUND OF DISCLOSURE

Capacitive touch screens are widely used in various electronic interactive scenario devices because of high durability, long service life, and multi-touch function. The capacitive touch screens detect a specific position of a finger touch by detecting capacitance change at a position of the finger touch. Therefore, when the capacitance change caused by the touch is small, conventional capacitive touch screens may not be able to accurately detect whether there is a touch input. Since a structural design scheme of a touch screen is a very important factor in detecting the capacitance change, it will be necessary to develop a touch screen design scheme that can detect a small capacitance change.

Currently, for flexible active-matrix organic light-emitting diode (AMOLED) display screens, patterns of a touch electrode usually need to be made directly on an upper surface of a thin-film encapsulation layer. However, because the encapsulation layer is thin (a thickness is usually about 10 um), therefore, a distance between the touch electrode and a cathode is small, resulting in a greater parasitic capacitance between a driving electrode (TX)/sensing electrode (RX) and the cathode, which leads to a greater resistance and capacitance (RC) delay and reduces touch sensitivity. Moreover, in current flexible AMOLED display screens, a material of the touch electrode is usually a hollow metal grid material, comparing its conductive area to a conductive area of a touch electrode with a conventional full-face transparent indium tin oxide (ITO) material, its actual effective conductive electrode area is smaller. Therefore, a mutual capacitance induction between the TX and the RX in the touch electrode is very small, resulting in a small capacitance change caused by the finger touch, which is not easily detected by a touch chip.

TECHNICAL PROBLEM

A touch substrate and a display panel are provided by this disclosure to solve a problem that a parasitic capacitance between a touch electrode and a cathode is greater in prior art, resulting in a reduction of sensitivity and accuracy of the touch substrate.

SUMMARY OF DISCLOSURE

A touch substrate is provided by this disclosure to realize the above-mentioned object. The touch substrate comprises a plurality of touch units, and each touch unit comprises a first electrode extending along a first direction and a second electrode extending along a second direction perpendicular to the first direction.

The first electrode comprises a first trunk electrode parallel to the first direction and a plurality of first branch electrodes disposed on two sides of the first trunk electrode. The first branch electrodes extend outwardly with the first trunk electrode as a center to form a radial structure.

The second electrode comprises a second trunk electrode parallel to the second direction and a plurality of second branch electrodes disposed on two sides of the second trunk electrode. The first branch electrodes and the second branch electrodes are alternately disposed to form an occlusal structure.

Furthermore, the first electrode further comprises: a first dry electrode disposed on the two sides of the first trunk electrode and defining a first included angle being less than 90° with the first trunk electrode; and the first branch electrodes are disposed on one side of the first dry electrode away from the first trunk electrode, and the first branch electrode defines a second included angle being less than 90° with the first trunk electrode.

Furthermore, the first dry electrode comprises at least two first sub-dry electrodes, and every two first sub-dry electrodes are connected to each other and surround with the first trunk electrode to define an opening; one side of each of the first sub-dry electrodes away from the opening is provided with at least three of the first branch electrodes, and a distance between adjacent two of the first branch electrodes is equal; and the greater a distance between the first branch electrodes and the first trunk electrode, the longer a length of the first branch electrodes.

Furthermore, the touch unit further comprises: a first virtual electrode disposed in the opening and electrically insulated from the first electrode.

Furthermore, one of the second branch electrodes is provided on two sides of each of the first branch electrodes, and the greater a distance between the second branch electrodes and the first trunk electrode, the longer a length of the second branch electrodes.

Furthermore, the first branch electrodes and the second branch electrodes adjacent to each other are parallel.

Furthermore, a gap is defined between the first branch electrodes and the second branch electrodes; and the touch unit further comprises: a second virtual electrode disposed in the gap and electrically insulated from the first electrode and the second electrode.

Furthermore, the first trunk electrode comprises two sub-trunk electrodes, the sub-trunk electrodes are located on the two sides of the second trunk electrode respectively and are bridged with each other through at least one conductive bridge.

Furthermore, the second electrode further comprises: the second electrode further comprises: a second dry electrode disposed on either side of the second trunk electrode and parallel to the second trunk electrode; and one side of the second dry electrode close to the first branch electrodes is provided with the plurality of second branch electrodes.

Furthermore, the touch unit further comprises: a third virtual electrode disposed on one side of the second electrode away from the first trunk electrode and electrically insulated from the second electrode.

Furthermore, a minimum width of branch electrodes in the first electrode and the second electrode is greater than a size of two sub-pixels.

Furthermore, the first electrode and the second electrode are composed of a metal grid material or a transparent conductive material.

Furthermore, the touch unit is axisymmetric with a first center line and a second center line perpendicular to each other as axes; the first center line is parallel to the first direction and corresponds to the first trunk electrode; and the second center line is parallel to the second direction and corresponds to the second trunk electrode.

Furthermore, the touch substrate comprises a plurality of first electrode groups arranged along the second direction and extending along the first direction; and a plurality of second electrode groups arranged along the first direction and extending along the second direction.

In the first direction, the first electrodes in adjacent two of touch units are electrically connected to each other, and the plurality of first electrodes electrically connected to each other are combined into one of the first electrode groups. In the second direction, the second electrodes in adjacent two of touch units are electrically connected to each other, and the plurality of second electrodes electrically connected to each other are combined into one of the second electrode groups.

Furthermore, the touch substrate further comprises a touch area, a non-touch area connected to the touch area, and a driving chip electrically connected to the first electrode groups and the second electrode groups through a plurality of signal wirings. The touch units are located in the touch area.

A display panel is further provided by this disclosure, the display panel comprises the touch substrate as mentioned above.

This disclosure achieves an advantageous effect that a touch substrate and a display panel provided by this disclosure enables a more uniform distribution of a mutual capacitive electric field in each touch unit by means of a radial branch electrode distribution structure. And an occlusion length between a first electrode and a second electrode in limited space is increased, greatly increasing a facing area between the first electrode and the second electrode. And then parasitic capacitance change between the first electrode and the second electrode after occurrence of touch is increased, effectively improving sensitivity and accuracy of the touch substrate when identifying a touch position. At a same time, a first branch electrode and a second branch electrode occluded with each other can reduce impedance in the first electrode and the second electrode, thus reducing RC delay in the touch unit and improving a reporting rate of the touch substrate.

BRIEF DESCRIPTION OF DRAWINGS

In order to illustrate technical solutions in embodiments of this disclosure more clearly, accompanying drawings that need to be used in a description of the embodiments will be briefly introduced as follows. Obviously, the drawings in following description are only some embodiments of this disclosure. For those skilled in the art, other drawings can also be obtained according to the disclosed drawings without creative efforts.

Components in the figures are shown as follows.

Figure 1:
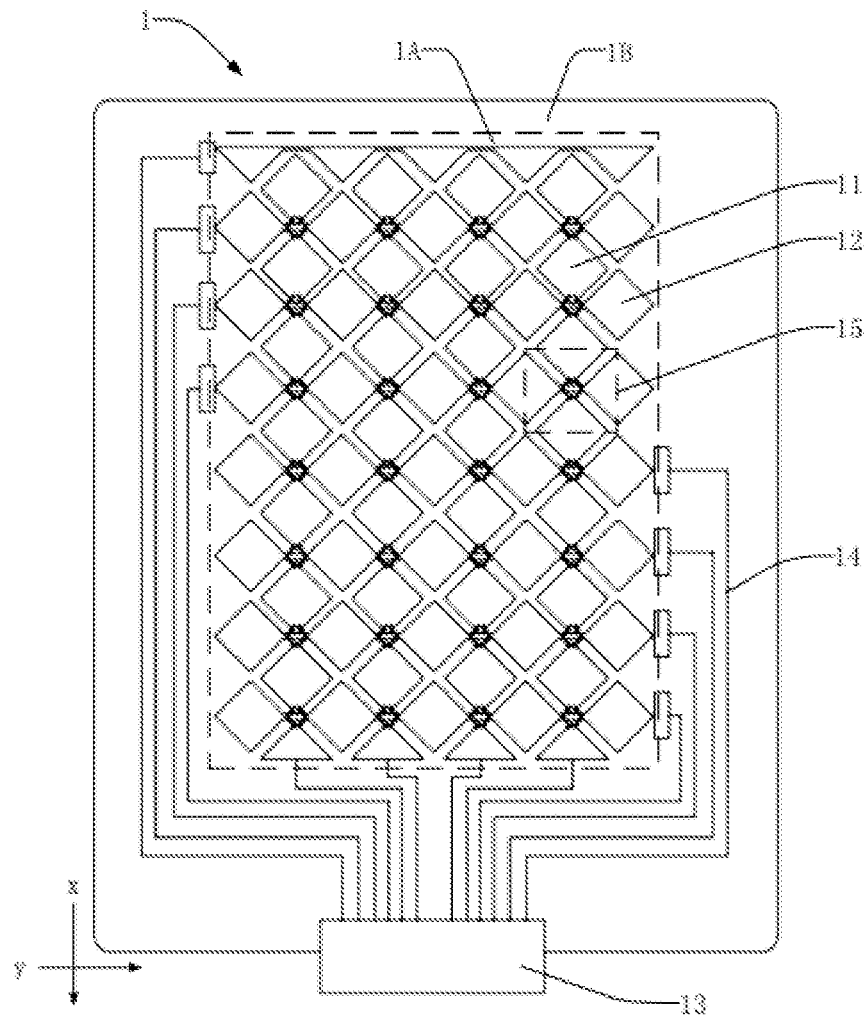
FIG. 1 is a schematic structural diagram of a touch substrate in an embodiment of this disclosure.

first direction x; second direction y; touch substrate 1; touch area 1A; non-touch area 1B; first electrode group 11; second electrode group 12; driving chip 13; signal wiring 14; touch unit 15; first center line L1; second center line L2; first area 15A; second area 15B; third area 15C; fourth area 15D; first electrode 100; first trunk electrode 110; sub-trunk electrode 111; conductive bridge 112; first dry electrode 120; first sub-dry electrode 121; first branch electrode 130; opening 140; second electrode 200; second trunk electrode 210; second dry electrode 220; second branch electrode 230; gap 240; first virtual electrode 310; second virtual electrode 320; third virtual electrode 330; metal wiring 400, fracture 410; insulating layer 500; display panel 1000; substrate layer 2; array substrate 3; light-emitting layer 4; light-emitting device 41; thin-film encapsulation layer 5; polarizer 6; covering plate 7.

DETAILED DESCRIPTION OF PREFERRED EMBODIMENTS

Following description of various embodiments refers to accompanying drawings to illustrate specific embodiments in which this disclosure may be practiced. Embodiments of this disclosure can completely introduce this disclosure to those skilled in the art, so as to make its technical content clearer and easier to understand. This disclosure can be embodied by many different forms of invention embodiments, and a protection scope of this disclosure is not limited to the embodiments mentioned in a text.

In drawings, units with a same structure are denoted by same reference labels, and units with similar structures or functions are denoted by similar numbers. Size and thickness of each component shown in the accompanying drawings are arbitrarily shown, but this disclosure is not limited thereto. In the drawings, thicknesses of parts are appropriately exaggerated in some places for clarity of understanding and ease of description.

In addition, the following description of the embodiments of this disclosure refers to the additional illustration to illustrate specific embodiments of this disclosure that this disclosure can be implemented. Directional terms mentioned in this disclosure only refer to directions of the attached drawings, such as "upper", "lower", "left", "right", "inside", "outside", "side", etc. Therefore, the directional terms used are for better and clearer explanation and understanding of this disclosure, rather than indicating or implying that a device or element must be provided with a particular orientation, be constructed and operate in a particular orientation. Therefore, it cannot be understood as a limitation of this disclosure. In addition, terms "first", "second", "third" and the like are only used for descriptive purposes and cannot be understood as indicating or implying relative importance.

When some parts are described as "be placed on" another part, the parts can be placed directly on the another part. There may also be an intermediate part, the parts are placed on the intermediate part, and the intermediate part is placed on the another part. When a part is described as "installed" or "connected" to another part, which can be understood as "installed" or "connected" directly, or the part is indirectly "installed" or "connected" to the another part through an intermediate part.

A touch substrate 1 is provided in an embodiment of this disclosure. As shown in FIG. 1, the touch substrate 1 has a touch area 1A and a non-touch area 1B connected to the touch area 1A.

In the touch area 1A, the touch substrate 1 includes a plurality of first electrode groups 11 and a plurality of second electrode groups 12. The plurality of first electrode groups 11 extend along a first direction x and is arranged along a second direction y, each of the plurality of first electrode groups 11 has a plurality of first electrodes 100 electrically connected to each other. The plurality of second electrode groups 12 extend along the second direction y and is arranged along the first direction x, each of the plurality of second electrode groups 12 have a plurality of second electrodes 200 electrically connected to each other. Wherein the first direction x is perpendicular to the second direction y, so that the first electrode groups 11 intersect the second electrode groups 12, and the first electrode groups 11 and the second electrode groups 12 are insulated from each other.

In the non-touch area 1B, the touch substrate 1 includes a plurality of signal wirings 14, the signal wirings 14 are used to electrically connect the first electrode groups 11 and the second electrode groups 12 to a driving chip 13, so as to transmit capacitance data generated in the touch area 1A to the driving chip 13 for processing, and then a touch signal is generated. Wherein each signal wiring 14 is electrically connected to one first electrode group 11 or one second electrode group 12, so as to transmit capacitance data generated in each row of electrode groups and each column of electrode groups to the driving chip 13.

In an intersecting first electrode group 11 and the second electrode group 12, the first electrode 100 at an intersecting position and a corresponding second electrode 200 disposed crosswise form a touch unit 15. The plurality of first electrode groups 11 intersect the plurality of second electrode groups 12 to form a plurality of touch units 15, the plurality of touch units 15 are disposed in an array in the touch substrate 1 along the first direction x and the second direction y.

Figure 2:
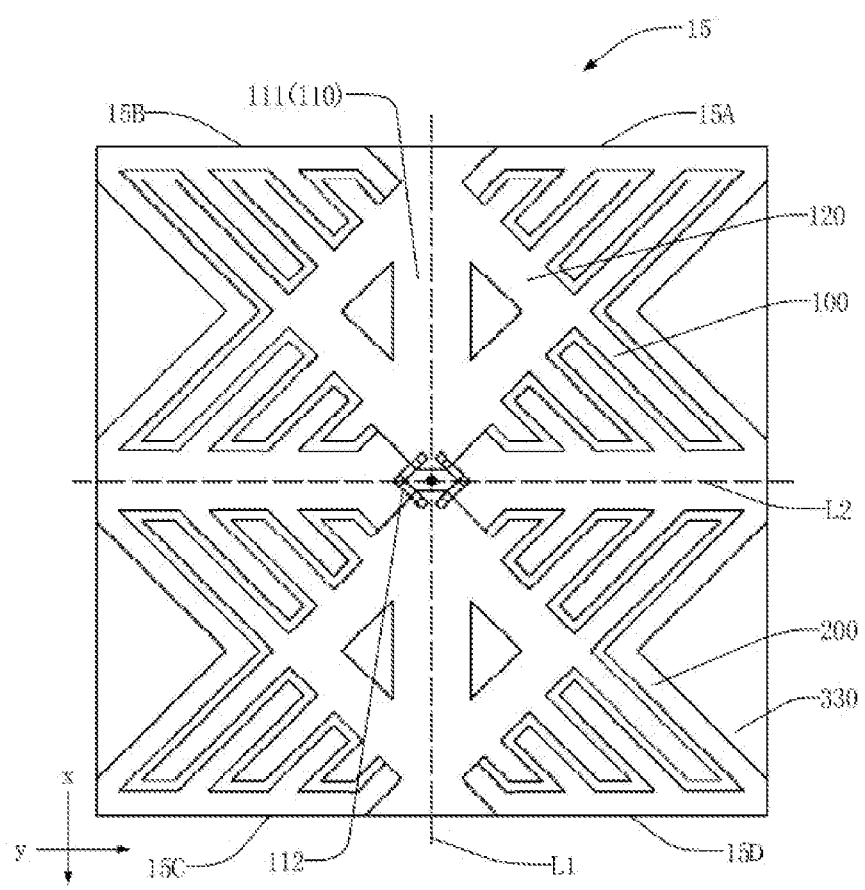
FIG. 2 is a schematic plan view of a touch unit in the embodiment of this disclosure.

As shown in FIG. 2, each touch unit 15 has the first electrode 100 and the second electrode 200. The touch unit 15 is an axisymmetric structure as well as a centrosymmetric structure having a symmetrical center and a first center line L1 and a second center line L2 passing through the symmetrical center and perpendicular to each other. The first center line L1 is parallel to the first direction x, and the second center line L2 is parallel to the second direction y. Wherein the first electrode 100 and the second electrode 200 are both left-right symmetrical with the first center line L1 as an axis, and the first electrode 100 and the second electrode 200 are both up-down symmetrical with the second center line L2 as an axis.

The touch unit 15 is divided into four repetition areas disposed in an array according to the first center line L1 and the second center line L2. The repetition areas are a first area 15A, a second area 15B, a third area 15C, and a fourth area 15D, respectively. In the first direction x, the first area 15A and the fourth area 15D are axisymmetric to the second area 15B and the third area 15C, with the first center line L1 as the axis. In the second direction y, the first area 15A and the second area 15B are axisymmetric to the third area 15C and the fourth area 15D, with the second center line L2 as the axis. The first area 15A is centrosymmetric to the third area 15C, with the symmetrical center as a center; the second area 15B is centrosymmetric to the fourth area 15D, with the symmetrical center as the center.

As shown in FIG. 2, the first electrode 100 includes a first trunk electrode 110, four first dry electrodes 120, and a plurality of first branch electrodes 130. The first trunk electrode 110 extends from the first area 15A and the second area 15B to the third area 15C and the fourth area 15D along the first direction x, and corresponds to the first center line L1, namely, the touch unit 15 is a left-right axisymmetric structure with the first trunk electrode 110 as an axis.

Figure 3:
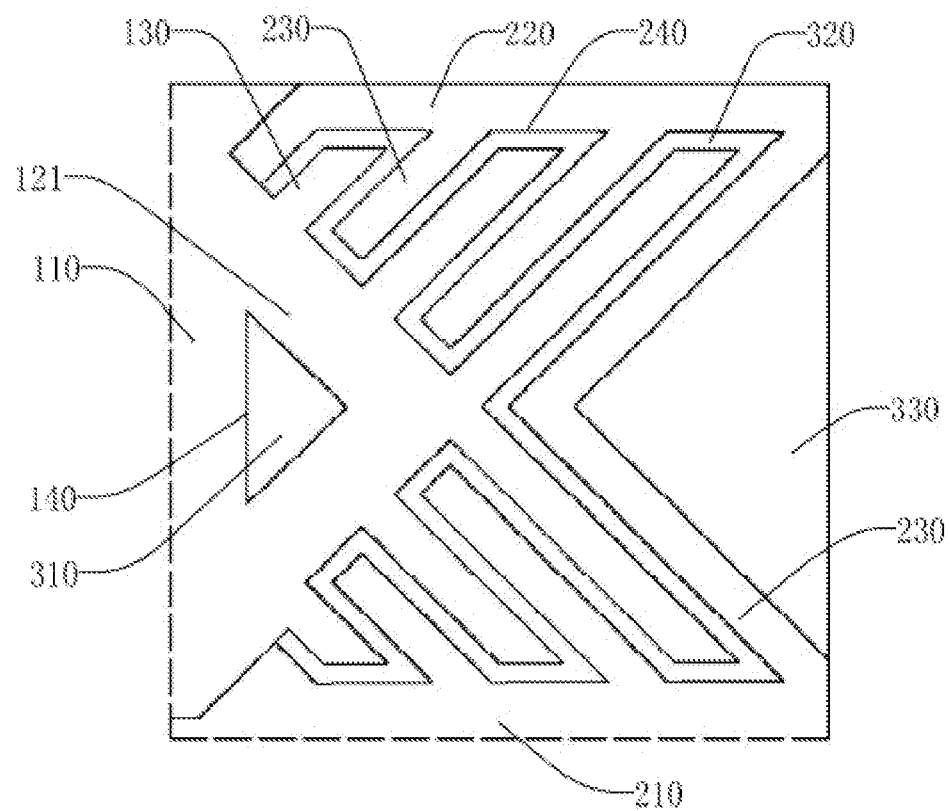
FIG. 3 is an enlarged schematic diagram of a first area in the touch unit in the embodiment of this disclosure.

The first dry electrodes 120 are disposed on two sides of the first trunk electrode 110, and each repetition area has one first dry electrode 120. Each first dry electrode 120 includes two first sub-dry electrodes 121. As shown in FIG. 3, in the first area 15A, ends of the two first sub-dry electrodes 121 are electrically connected to each other, another ends of the two first sub-dry electrodes 121 are electrically connected to the first trunk electrode 110, respectively. The two first sub-dry electrodes 121 and the first trunk electrode 110 surround to form a triangular structure having an opening 140. Preferably, lengths of the first sub-dry electrodes 121 located at a same repetition area are same, so that the surrounding triangular structure is an isosceles triangular structure, and a symmetrical axis of the isosceles triangular structure is parallel to the second center line L2.

As shown in FIG. 3, the first sub-dry electrodes 121 are inclined to the first trunk electrode 110 to form a first included angle, the first included angle is less than 90° and greater than 0°. Preferably, the first included angle between the first sub-dry electrode 121 and the first trunk electrode 110 is 45°. Therefore, the triangular structure formed by the first sub dry-electrodes 121 and the first trunk electrode 110 is the isosceles right triangular structure.

The first branch electrodes 130 are disposed on one side of the first dry electrode 120 away from the first trunk electrode 110 and intersect with the first dry electrode 120 to be electrically connected to the first dry electrode 120. Each touch unit 15 is further provided with the first branch electrodes 130. As shown in FIG. 3, in the first area 15A, each first sub-dry electrode 121 is provided with the first branch electrodes 130, and a number of the first branch electrodes 130 on each first sub-dry electrode 121 is same. Preferably, each first sub-dry electrode 121 is provided with three first branch electrodes 130, and distance between adjacent two of first branch electrodes 130 is equal.

On a same first sub-dry electrode 121, ends of the first branch electrodes 130 away from the first sub-dry electrode 121 are located in a same line, and the line is parallel to the second direction y. Since the first sub-dry electrode 121 is obliquely connected to the first trunk electrode 110, distances between different positions on the first sub-dry electrode 121 and the line are different, making the first branch electrodes 130 be provided with different lengths. Specifically, the greater a distance between the first branch electrode 130 and the first trunk electrode 110, the longer a length of the first branch electrode 130. That is, a first branch electrode 130 furthest from the first trunk electrode 110 has a longest length and a first branch electrode 130 closest to the first trunk electrode 110 has a shortest length.

The first branch electrodes 130 are inclined to the first trunk electrode to form a second included angle. The second included angle is greater than 0° and less than 90°. A third included angle is defined between the first branch electrode 130 and the first sub-dry electrode 121, the third included angle is not equal to 0° or 180°. Preferably, the first included angle between the first branch electrode 130 and the first trunk electrode 110 is 45°, and the third included angle between the first branch electrode 130 and the first sub-dry electrode 121 is 90°.

As shown in FIG. 2, a structure of the first electrode 100 in the second area 15B, the third area 15C, and the fourth area 15D is same as a structure of the first electrode 100 in the first area 15A. Moreover, according to a principle of geometric symmetry, the first electrode 100 in the second area 15B and the first electrode 100 in the first area 15A are axisymmetric with the first center line L1 as the axis; and the first electrode 100 in the third area 15C and the first electrode 100 in the first area 15A are centrosymmetric with the symmetrical center as the center point. The first electrode 100 in the fourth area 15D and the first electrode 100 in the first area 15A are axisymmetric with the second center line L2 as the axis.

As shown in FIG. 2, the second electrode 200 includes a second trunk electrode 210, four second dry electrodes 220, and a plurality of second branch electrodes 230. The second trunk electrode 210 extends from the second area 15B and the third area 15 C to the first area 15A and the fourth area 15D along the second direction y and corresponds to the second center line L2. That is, the touch unit 15 is an up-down axisymmetric structure with the second trunk electrode 210 as an axis.

The second dry electrodes 220 are disposed on two sides of the second trunk electrode 210 and each repetition area has one second dry electrode 220. As shown in FIG. 3, in the first area 15A, the second dry electrode 220 is disposed on one end of the first branch electrode 130 away from the second trunk electrode 210, and the second dry electrode 220 is parallel to the second trunk electrode 210.

The second branch electrodes 230 are disposed on one side of the second trunk electrode 210 and the second dry electrodes 220 close to the first branch electrodes 130. As shown in FIG. 3, in the first area 15A, the first branch electrodes 130 and the second branch electrodes 230 are disposed alternately. Each first branch electrode 130 has one second branch electrode 230 on either side. One end of the second branch electrode 230 away from the first dry electrode 120 is connected to the second dry electrode 220 or the second trunk electrode 210 to form a half-surrounding structure, and the first branch electrodes 130 are surrounded in the half-surrounding structure. However, the first branch electrode 130 and the second branch electrode 230 are insulated from each other and have a gap 240. A second branch electrode 230 furthest from the first trunk electrode 110 on the second trunk electrode 210 is electrically connected to a second branch electrode 230 furthest from the first trunk electrode 110 on the second dry electrode 220, so that the second trunk electrode 210 is electrically connected to the second dry electrode 220.

Specifically, in a same touch unit 15, a distance between adjacent two of second branch electrodes 230 on a same second trunk electrode 210 or a same second dry electrode 220 is same. The second branch electrode 230 is parallel to the first branch electrode 130. A fourth included angle is defined between the second branch electrode 230 and the second trunk electrode 210, an angle of the fourth included angle is same as an angle of the first included angle. Moreover, because lengths of the first branch electrodes 130 on a same first sub-dry electrode 121 are different, therefore, lengths of the second branch electrodes 230 on a same second trunk electrode 210 or on a same second dry electrode 220 in the same touch unit 15 are different. The length of the second branch electrode 230 also increases with an increase of a distance between the second branch electrode 230 and the first trunk electrode 110, that is, a length of a second branch electrode 230 furthest from the first trunk electrode 110 is longest, and a length of a second branch electrode 230 closest to the first trunk electrode 110 is shortest.

As shown in FIG. 2, a structure of the second electrode 200 in the second area 15B, the third area 15C, and the fourth area 15D is same as a structure of the second electrode 200 in the first area 15A. Moreover, according to the principle of geometric symmetry, the second electrode 200 in the second area 15B and the second electrode 200 in the first area 15A are left-right axisymmetric with the first center line L1 as the axis; and the second electrode 200 in the third area 15C and the second electrode 200 in the first area 15A are centrosymmetric with the symmetrical center area as the center point. The second electrode 200 in the fourth area 15D and the second electrode 200 in the first area 15A are up-down axisymmetric with the second center line L2 as the axis.

Furthermore, a width of the first branch electrode 130 is less than a width of the first trunk electrode 110 and a width of the first dry electrode 120, a width of the second branch electrode 230 is less than a width of the second trunk electrode 210 and a width of the second dry electrode 220, and the width of the first branch electrode 130 is equal to the width of the second branch electrode 230. Moreover, a minimum width of the branch electrodes in the first electrode 100 and the second electrode 200 is greater than a size of two sub-pixels, that is, a minimum width of the first branch electrode 130 and a minimum width of the second branch electrode 230 are greater than the size of the two sub-pixels.

Figure 4:
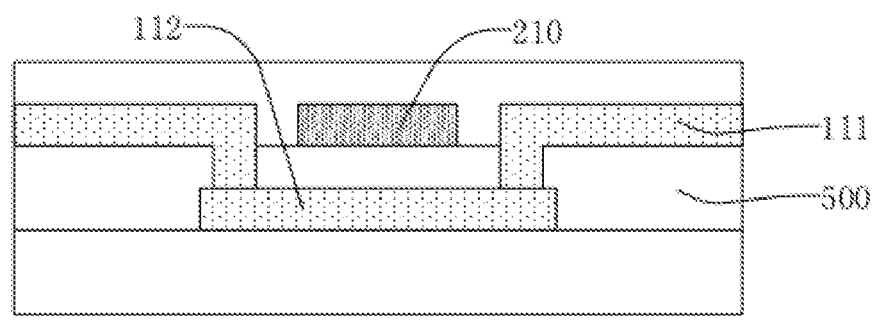
FIG. 4 is a schematic diagram of a layered structure of a conductive bridge in the embodiment of this disclosure.

The first electrode 100 and the second electrode 200 are insulated from each other. Specifically, as shown in FIG. 2 and FIG. 4, the first electrode 100 and the second electrode 200 are in a same metal layer. The first trunk electrode 110 includes two sub-trunk electrodes 111, and the two sub-trunk electrodes 111 are disposed on two sides of the second trunk electrode 210, respectively, and the two sub-trunk electrodes 111 are bridged through a conductive bridge 112 to be electrically connected to each other, so as to avoid the first electrode 100 and the second electrode 200 are being electrically connected to each other. Wherein an insulating layer 500 is provided between the conductive bridge 112 and the second trunk electrode 210. The sub-trunk electrodes 111 penetrate through the insulating layer 500 to be electrically connected to the conductive bridge 112 located below the second trunk electrode 210. A number of connecting bridges and structures of the connecting bridges are not limited in this disclosure, which can adopt a doubled-bridge structure as shown in FIG. 2. The two conductive bridges 112 are independent and are not connected to each other, and the two conductive bridges 112 are also left-right axisymmetric with the first center line L1 as the axis.

Figure 5:
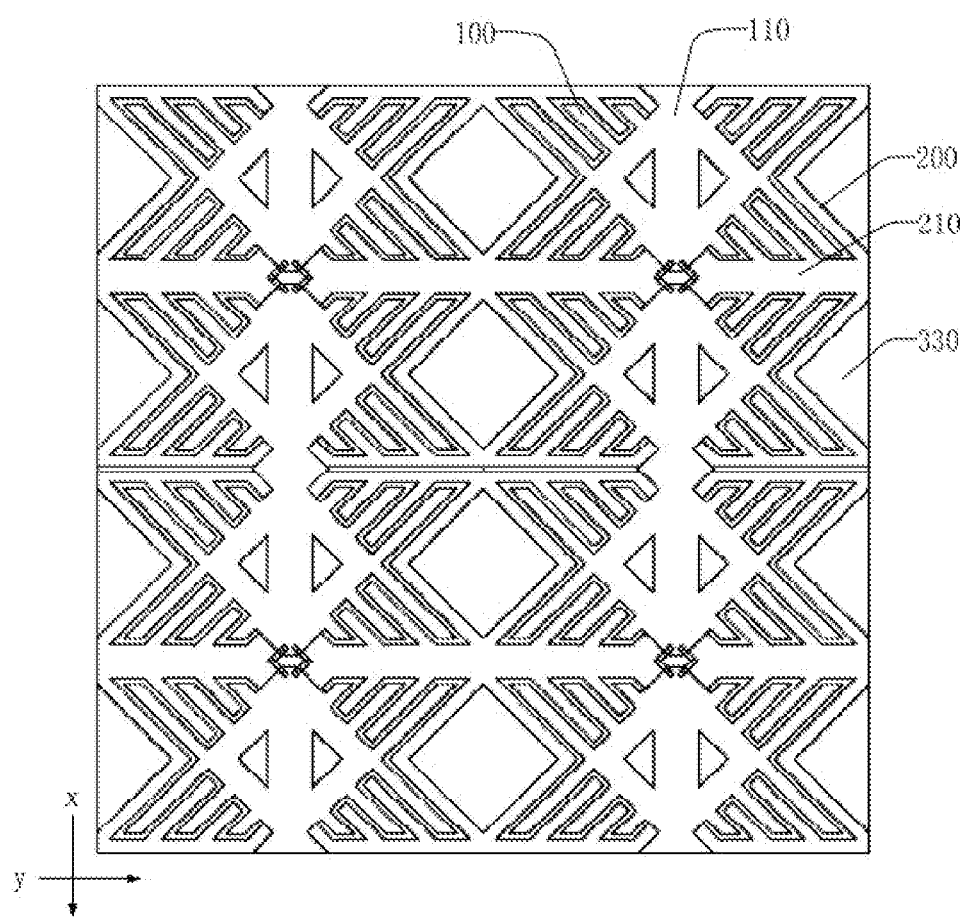
FIG. 5 is a schematic plan view of four touch units arranged in an array in the embodiment of this disclosure.

Furthermore, as shown in FIG. 5, in the first direction x, two first trunk electrodes 110 in adjacent two of touch units 15 are electrically connected to each other; and two second electrodes 200 in the adjacent two of touch units 15 in the first direction x are insulated from each other to form a first electrode group 11 extending along the first direction x. In the second direction y, two second trunk electrodes 210 in adjacent two of touch units 15 are electrically connected to each other; and two first electrodes 100 in the adjacent two of touch units 15 in the second direction y are insulated from each other to form a second electrode group 12 extending along the second direction y.

In embodiments of this disclosure, the first electrode 100 is a driving electrode, and the second electrode 200 is a sensing electrode. When a finger touches a display device provided with the touch substrate 1 in the embodiments of this disclosure, parasitic capacitance between the first electrode 100 and the second electrode 200 at a finger touch location will increase, resulting in a mutual capacitance signal; and the driving chip 13 detects a specific location of the finger touch by obtaining capacitance change before and after the touch. Therefore, when the capacitance change caused by touch is small, a conventional capacitive touch screen may not be able to accurately detect whether there is a touch input.

However, in the embodiments of this disclosure, as show in FIG. 2, one end of the first branch electrode 130 is electrically connected to the first dry electrode 120, and another end of the first branch electrode 130 extends to the second trunk electrode 210 or the second dry electrode 220. The plurality of first branch electrodes 130 form a radial structure extending outwardly, with the first trunk electrode 110 as a center. Correspondingly, one end of the second branch electrode 230 is electrically connected to the second dry electrode 220 or the second trunk electrode 210, and another end of the second branch electrode 230 extends to the first trunk electrode 110. Moreover, the second branch electrode 230 and the first branch electrode 130 of the radial structure are alternately disposed and occluded with each other, so that the second electrode 200 surrounds the first electrode 100 and each branch electrode of the first electrode 100, and an occlusion length between the first electrode 100 and the second electrode 200 in a limited space is greatly increased, greatly increasing a facing area between the first electrode 100 and the second electrode 200, which increases the parasitic capacitance between the first electrode 100 and the second electrode 200 and a parasitic capacitance change, improving sensitivity of the touch substrate 1 when identifying a touch position.

At a same time, radiating branch electrodes distribution makes a mutual capacitive electric field in each touch unit 15 more evenly distributed, which is more conducive to improving resolution and accuracy of the touch substrate 1 when identifying the touch position. And compared with a situation that only the first trunk electrode 110 is provided, the plurality of first branch electrodes 130 disposed on two sides of the first trunk electrode 110 can reduce impedance of the first electrode 100. Similarly, the plurality of second branch electrodes 230 disposed on two sides of the second trunk electrode 210 can also reduce impedance of the second electrode 200. Reduction of impedance in the first electrode 100 and the second electrode 200 can further reduce an RC delay of an entire touch unit 15, thus enhancing a reporting rate of the touch substrate 1.

Furthermore, each touch unit 15 has a virtual electrode. The virtual electrode includes a first virtual electrode 310, a second virtual electrode 320, and a third virtual electrode 330. As shown in FIG. 3, in the first area 15A, the first virtual electrode 310 is disposed in the opening 140, and the first virtual electrode 310 is electrically insulated from the first trunk electrode 110 and the first dry electrode 120 and is not connected with the first trunk electrode 110 and the first dry electrode 120. The second virtual electrode 320 is disposed in the gap 240 located between the first branch electrode 130 and the second branch electrode 230, and the second virtual electrode 320 is also electrically insulated from the first branch electrode 130 and the second branch electrode 230. The third virtual electrode 330 is disposed on one side of the second electrode 200 away from the first trunk electrode 110, that is, the third virtual electrode 330 is disposed on one side of a second branch electrode 230 with a longest length away from the first branch electrode 130. And the third virtual electrode 330 is electrically insulated from the second branch electrode 230. The first virtual electrode 310, the second virtual electrode 320, and the third virtual electrode 330 are not loaded with electrical signals. Wherein, the first virtual electrode 310 and the third virtual electrode 330 are used to reduce the parasitic capacitance of the first electrode 100 and the second electrode 200 to a cathode in a display panel 1000. The second virtual electrode 320 is used to increase the parasitic capacitance change between the first electrode 100 and the second electrode 200 when the finger touches, so as to further improve sensitivity of the touch substrate 1. At a same time, the second virtual electrode 320 can also electrically isolate the adjacent first electrode 100 and the second electrode 200 to prevent a short circuit between them.

As shown in FIG. 2, a structure of the virtual electrode in the second area 15B, the third area 15C, and the fourth area 15D is same as a structure of the virtual electrode in the first area 15A. Moreover, according to the principle of geometric symmetry, the virtual electrode in the second area 15B and the virtual electrode in the first area 15A are left-right axisymmetric with the first center line L1 as the axis; and the virtual electrode in the third area 15C and the virtual electrode in the first area 15A are centrosymmetric with the symmetrical center as the center point. The virtual electrode in the fourth area 15D and the virtual electrode in the first area 15A are up-down axisymmetric with the second center line L2 as the axis.

Figure 6:
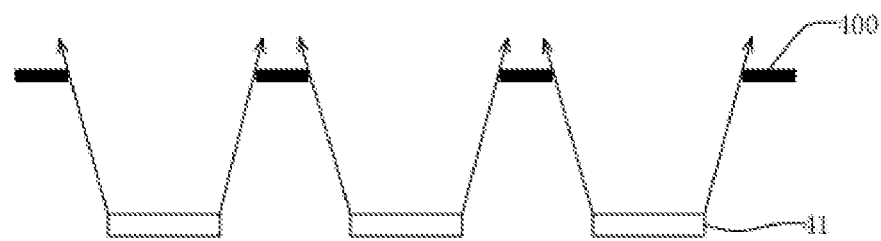
FIG. 6 is a layered schematic diagram between a metal wiring and a light-emitting device in the embodiment of this disclosure.
Figure 7:
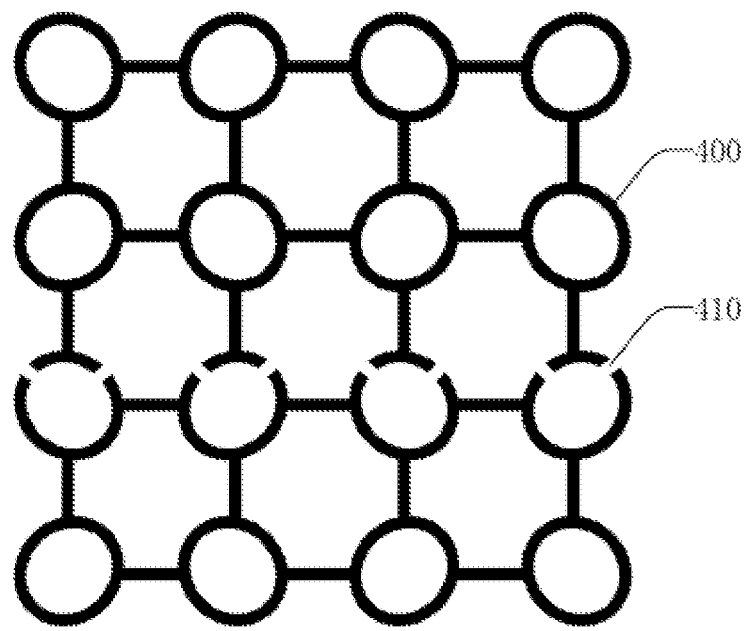
FIG. 7 is a schematic plan view of a metal grid structure in the embodiment of this disclosure.

Furthermore, materials of the first electrode 100, the second electrode 200, and the virtual electrode can be composed of a metal material or a transparent conductive material, such as one of titanium, aluminum, molybdenum, silver, copper, indium tin oxide (ITO), or zinc aluminum oxide (AZO). When the metal material is adopted, in order to prevent the touch substrate 1 from affecting light-emitting of the display panel 1000, the first electrode 100, the second electrode 200, and the virtual electrode are all composed of metal grid structures, and as shown in FIG. 6, an orthographic projection of a metal wiring 400 in the metal grid structure on the display panel 1000 is located between adjacent two of light-emitting devices 41. As shown in FIG. 7, a fracture 410 is defined on the metal wiring 400 in the metal grid structure; and the first electrode 100, the second electrode 200, and the virtual electrode are electrically insulated from each other through a plurality of fractures 410.

Specifically, experiments were conducted for a touch unit in prior art and the touch unit 15 provided in the embodiments of this disclosure under a same energized environment, and relevant data were obtained as shown in Table 1.

TABLE 1

|  | touch unit in the prior art | touch unit provided in the embodiments of this disclosure |
|---|---|---|
| parasitic capacitance when a finger touches Cm (pf) | 0.74 | 0.378 |
| parasitic capacitance when a finger does not touch Cm' (pf) | 0.69 | 0.317 |
| parasitic capacitance change ΔCm (pf) | 0.05 | 0.061 |
| ratio of the parasitic capacitance change to the parasitic capacitance ΔCm/Cm | 6.76% | 16.14% |
| mutual capacitance of a finger to a driving electrode C(finger-TX) (pf) | 0.25 | 0.163 |
| mutual capacitance of a finger to a sensing electrode C(finger-RX) (pf) | 0.232 | 0.261 |

TABLE 1-continued

| | touch unit in the prior art | touch unit provided in the embodiments of this disclosure |
|---|---|---|
| self-capacitance of the driving electrode to a cathode TX unit Cb (pf) | 10.162 | 8.253 |
| self-capacitance of the sensing electrode to the cathode RX unit Cb (pf) | 9.395 | 8.135 |
| self-impedance of the driving electrode TX unit R (ohm) | 29.3 | 29.387 |
| breeding impedance of the sensing electrode RX unit R (ohm) | 40.48 | 30.225 |

Based on what can be seen in Table 1, for the touch unit 15 provided in the embodiments of this disclosure, the parasitic capacitance of the first electrode 100 and the second electrode 200 is 0.317 pf when the finger does not touch the touch unit 15. When the finger touches the touch unit 15, the parasitic capacitance of the first electrode 100 and the second electrode 200 is 0.378 pf, that is, the parasitic capacitance change of the first electrode 100 and the second electrode 200 is 0.061 pf, that is, the ratio of the parasitic capacitance change to the parasitic capacitance is 16.14%.

For a conventional touch unit, when the finger does not touch the conventional touch unit, parasitic capacitance of a driving electrode and a sensing electrode in the conventional touch unit is 0.69 pf. When the finger touches the touch unit, the parasitic capacitance of the driving electrode and the sensing electrode in the conventional touch unit is 0.74 pf. That is, parasitic capacitance change of the driving electrode and the sensing electrode in the conventional touch unit is 0.05 pf, namely, a ratio of the parasitic capacitance change to the parasitic capacitance can be 6.76%.

In summary, compared with the conventional touch unit, the touch unit 15 is adopted as shown in FIG. 2, the parasitic capacitance of the driving electrode and the sensing electrode can be reduced by 0.362 pf when the finger touches; and the parasitic capacitance change of the driving electrode and the sensing electrode can be increased by 0.011 pf. Therefore, this solution can realize the first electrode 100 and the second electrode 200 having less parasitic capacitance and greater parasitic capacitance change, so as to improve the ratio of the parasitic capacitance change to the parasitic capacitance, and thus improving the touch accuracy and sensitivity of the touch panel.

Figure 8:
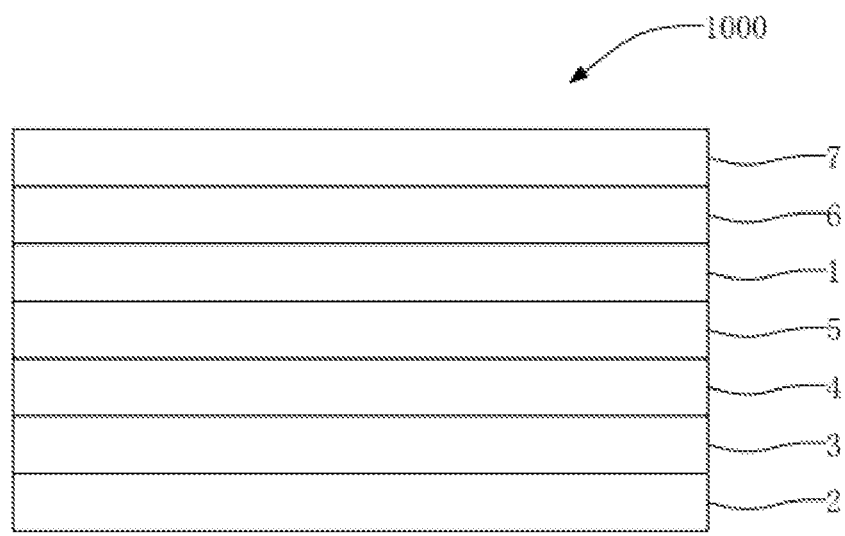
FIG. 8 is a schematic diagram of a layered structure of a display panel in the embodiment of this disclosure.

A display panel 1000 is further provided in the embodiments of this disclosure, which can be one of different types of light-emitting display panels 1000 such as an organic light-emitting diode (OLED) display panel, an active matrix organic light-emitting diode (AMOLED) display panel, a mini light-emitting diode (mini-LED) display panel, or a micro light-emitting diode (micro-LED) display panel. As shown in FIG. 8, the display panel 1000 includes a substrate layer 2, an array substrate 3, a light-emitting layer 4, a thin-film encapsulation layer 5, a polarizer 6, a covering plate 7, and the touch substrate 1 mentioned above. The substrate layer 2, the array substrate 3, the light-emitting layer 4, and the thin-film encapsulation layer 5 are stacked in sequence. The touch substrate 1 is disposed on one surface of the thin-film encapsulation layer 5 away from the light-emitting layer 4. The polarizer 6 and the covering plate 7 are sequentially stacked on a surface of the touch substrate 1 away from the thin-film encapsulation layer 5. Wherein light-emitting devices 41 are located in the light-emitting layer 4. The light-emitting devices 41 can be selected from light-emitting bodies, such as OLEDs, mini-LEDs, or micro-LEDs according to requirements.

The touch substrate and the display panel are provided in the embodiments of this disclosure, which enables a more uniform distribution of the mutual capacitive electric field in each touch unit by means of a radial branch electrode distribution structure, and the occlusion length between the first electrode and the second electrode in the limited space is increased, greatly increasing the facing area between the first electrode and the second electrode. And then the parasitic capacitance change between the first electrode and the second electrode after occurrence of touch is increased, effectively improving sensitivity and accuracy of the touch substrate when identifying a touch position. At a same time, the first branch electrode and the second branch electrode occluded with each other can reduce the impedance in the first electrode and the second electrode, thus reducing the RC delay in the touch unit and improving the reporting rate of the touch substrate.

Although this disclosure is described here with reference to particular embodiments, it should be understood that these embodiments are merely examples of principles and applications of this disclosure. Therefore, it should be understood that many modifications can be made to exemplary embodiments and that other arrangements can be devised, provided that they do not depart from spirit and a scope of this disclosure as defined by appended claims. It should be understood that it is possible to combine different dependent claims and features described here by means different from those described in original claims. It is also to be understood that features described in combination with separate embodiments may be used in other described embodiments.

What is claimed is:

1. A touch substrate, comprising a plurality of touch units and each touch unit comprising:
a first electrode extending along a first direction and comprising:
a first trunk electrode parallel to the first direction;
a plurality of first branch electrodes disposed on two sides of the first trunk electrode; the first branch electrodes extending outwardly with the first trunk electrode as a center to form a radial structure; and
first dry electrodes disposed on the two sides of the first trunk electrode and connected to the first trunk electrode, wherein the first branch electrodes are disposed on one side of the first dry electrodes away from the first trunk electrode and connected to the first dry electrode, and the first branch electrode defines a second included angle being less than 90° and greater than 0° with the first trunk electrode; and
wherein each of the first dry electrodes comprises at least two first sub-dry electrodes, every two first sub-dry electrodes are connected to each other and surround with the first trunk electrode to define an opening, and each of the first sub-dry electrodes defines a first included angle being less than 90° and greater than 0° with the first trunk electrode; and
a second electrode extending along a second direction perpendicular to the first direction and comprising:
a second trunk electrode parallel to the second direction; and
a plurality of second branch electrodes disposed on two sides of the second trunk electrode;

wherein the first branch electrodes and the second branch electrodes are alternately disposed to form an occlusal structure.

2. The touch substrate as claimed in claim 1, wherein one side of each of the first sub-dry electrodes away from the opening is provided with at least three of the first branch electrodes, and a distance between adjacent two of the first branch electrodes is equal; and the greater a distance between the first branch electrodes and the first trunk electrode, the longer a length of the first branch electrodes.

3. The touch substrate as claimed in claim 1, wherein the touch unit further comprises:

a first virtual electrode disposed in the opening and electrically insulated from the first electrode.

4. The touch substrate as claimed in claim 3, wherein one of the second branch electrodes is provided on two sides of each of the first branch electrodes, and the greater a distance between the second branch electrodes and the first trunk electrode, the longer a length of the second branch electrodes.

5. The touch substrate as claimed in claim 4, wherein first branch electrodes and second branch electrodes adjacent to each other are parallel.

6. The touch substrate as claimed in claim 4, wherein a gap is defined between the first branch electrodes and the second branch electrodes; and the touch unit further comprises:

a second virtual electrode disposed in the gap and electrically insulated from the first electrode and the second electrode.

7. The touch substrate as claimed in claim 1, wherein the first trunk electrode comprises two sub-trunk electrodes, the sub-trunk electrodes are located on the two sides of the second trunk electrode respectively and are bridged with each other through at least one conductive bridge.

8. The touch substrate as claimed in claim 2, wherein the second electrode further comprises:

a second dry electrode disposed on either side of the second trunk electrode and parallel to the second trunk electrode; and one side of the second dry electrode close to the first branch electrodes is provided with the plurality of second branch electrodes.

9. The touch substrate as claimed in claim 8, wherein the touch unit further comprises:

a third virtual electrode disposed on one side of the second electrode away from the first trunk electrode and electrically insulated from the second electrode.

10. The touch substrate as claimed in claim 9, wherein one of the second branch electrodes connected to the second dry electrode and adjacent to the third virtual electrode is connected to another one of the second branch electrodes connected to the second trunk electrode and adjacent to the third virtual electrode.

11. The touch substrate as claimed in claim 1, wherein the first electrode and the second electrode are composed of a metal grid material or a transparent conductive material.

12. The touch substrate as claimed in claim 1, wherein the touch unit is axisymmetric with a first center line and a second center line perpendicular to each other as axes;

the first center line is parallel to the first direction and corresponds to the first trunk electrode; and the second center line is parallel to the second direction and corresponds to the second trunk electrode.

13. The touch substrate as claimed in claim 1, comprising:

a plurality of first electrode groups arranged along the second direction and extending along the first direction; and a plurality of second electrode groups arranged along the first direction and extending along the second direction;

the touch units are arranged in an array in the touch substrate;

in the first direction, the first electrodes in adjacent two of touch units are electrically connected to each other, and the plurality of first electrodes electrically connected to each other are combined into one of the first electrode groups; and in the second direction, the second electrodes in adjacent two of touch units are electrically connected to each other, and the plurality of second electrodes electrically connected to each other are combined into one of the second electrode groups.

14. The touch substrate as claimed in claim 13, further comprising:

a touch area, the touch units located in the touch area;

a non-touch area connected to the touch area; and a driving chip electrically connected to the first electrode groups and the second electrode groups through a plurality of signal wirings.

15. A display panel, comprising:

a plurality of touch units and each touch unit comprising:

a first electrode extending along a first direction and comprising:

a first trunk electrode parallel to the first direction;

a plurality of first branch electrodes disposed on two sides of the first trunk electrode;

therefore the first branch electrodes extending outwardly with the first trunk electrode as a center to form a radial structure; and first dry electrodes disposed on the two sides of the first trunk electrode and connected to the first trunk electrode, wherein the first branch electrodes are disposed on one side of the first dry electrodes away from the first trunk electrode and connected to the first dry electrode, and the first branch electrode defines a second included angle being less than 90° and greater than 0° with the first trunk electrode; and wherein each of the first dry electrodes comprises at least two first sub-dry electrodes, every two first sub-dry electrodes are connected to each other and surround with the first trunk electrode to define an opening, and each of the first sub-dry electrodes defines a first included angle being less than 90° and greater than 0° with the first trunk electrode; and a second electrode extending along a second direction perpendicular to the first direction and comprising:

a second trunk electrode parallel to the second direction; and a plurality of second branch electrodes disposed on two sides of the second trunk electrode;

wherein the first branch electrodes and the second branch electrodes are alternately disposed to form an occlusal structure.

16. The display panel as claimed in claim 15, wherein one side of each of the first sub-dry electrodes away from the opening is provided with at least three of the first branch electrodes, and a distance between adjacent two of the first branch electrodes is equal; and the greater a distance between the first branch electrodes and the first trunk electrode, the longer a length of the first branch electrodes.

17. The display panel as claimed in claim 15, wherein the touch unit further comprises:
- a first virtual electrode disposed in the opening and electrically insulated from the first electrode.

18. The display panel as claimed in claim 15, wherein the second electrode further comprises:
- a second dry electrode disposed on either side of the second trunk electrode and parallel to the second trunk electrode; and
- one side of the second dry electrode close to the first branch electrodes is provided with the plurality of second branch electrodes.

\* \* \* \* \*